INVENTORS
Alex W. Dreyfoos
+ George W. Mergens,
BY Diggins & Le Blanc
ATTORNEYS

INVENTORS

Alex W. Dreyfoos

+ George W. Mergens,

BY Diggins + LeBlanc

ATTORNEYS

INVENTORS
Alex W. Dreyfoos
+ George W. Mergens,
BY Diggins + LeBlanc
ATTORNEYS

United States Patent Office 3,237,513

Patented Mar. 1, 1966

3,237,513

COLOR PRINTER

Alex W. Dreyfoos, Port Chester, N.Y., and George W. Mergens, Wilton, Conn., assignors to The Pavelle Corporation, New York, N.Y., a corporation of New York Filed Feb. 6, 1962, Ser. No. 171,448
6 Claims. (Cl. 88—24)

This invention relates to the printing of color photographs and more particularly to a novel exposure control system and rebalancing method for use in color printing.

In the making of color prints from color negatives, a problem arises in determining the required amounts of red, green and blue exposure for the respective sensitized layers of the color print material. A trial and error system requiresd guessing, almost at random, on initial exposure and making and processing a print, judging the color balance of the print, making a correction in the exposure, and reprinting. In judging a color print, the relatively inexperienced worker can determine the direction of unbalance, i.e., green, yellow or dark, but even the most experienced worker has considerable difficulty in ascertaining quantiatively how much unbalance exists. Thus, a trial and error system results, involving an iterative process that can consume considerable time and material.

The above problem of trial and error exists not only with respect to the different color transmission properties of different negatives but also arises with respect to the particular emulsion and developing processes being used. Thus any system being used must not only compensate for different negatives but must be adjusted so that its response matches that of the particular emulsion.

It has been known for many years that quite a large percent of color prints will be satisfactory if the integrated quantity of red, green and blue light exposing the print material is held constant regardless of the negative's characteristics. A number of electronic systems have been devised to determine color exposure in this manner and these systems have found wide use in the color photofinishing industry. However, because of the high cost of this equipment, its use has been mostly restricted to large production establishments.

The present invention improves over known constructions by providing an electronic color exposure control system of substantially reduced expense. It further provides a simplified color control system completely insensitive to minor variations in line voltage fluctuations and one that automatically compensates for the effects of lamp aging and shifts in lamp color temperatures. In addition, the present invention provides a simplified rebalancing method for adjusting a color developing system to different emulsions.

It is therefore a primary object of the invention to provide an improved color printer.

Another object of the persent invention is to provide an improved exposure control system.

Another object of the present invention is to provide an improved exposure control rebalancing method.

Another object of the present invention is to provide an exposure control system of relatively inexpensive construction which automatically compensates for the effects of lamp aging and shifts in lamp color temperature.

Another object of the present invention is to provide a simplified exposure control system substantially independent of minor changes in the line voltage.

Another object of the present invention is to provide a novel exposure control method for matching printers to different photographic emulsions.

These and further objects and advantages of the invention will be more apparent upon reference to the following specification, claims and appended drawings wherein:

It has been known for many years that quite a large percent of color prints will be satisfactory if the integrated quantity of red, green and blue light exposing the print material is held constant regardless of the negative's characteristics. That is to say, if the intensity-time product for each of the red, green and blue lights is held constant irrespective of the light transmission properties of the particular negative, a large percent of satisfactory color prints will be obtained. A number of electronic systems have been devised to determine color exposure in this manner, one such system being disclosed in British Patent 660,099, published Oct. 31, 1951.

Figure 1:
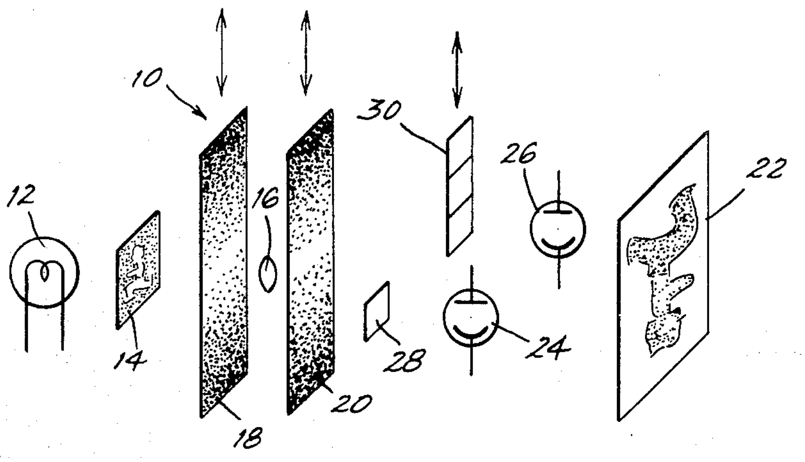
FIGURE 1 is a diagrammatic perspective view of the novel printer of the present invention.
Figure 2:
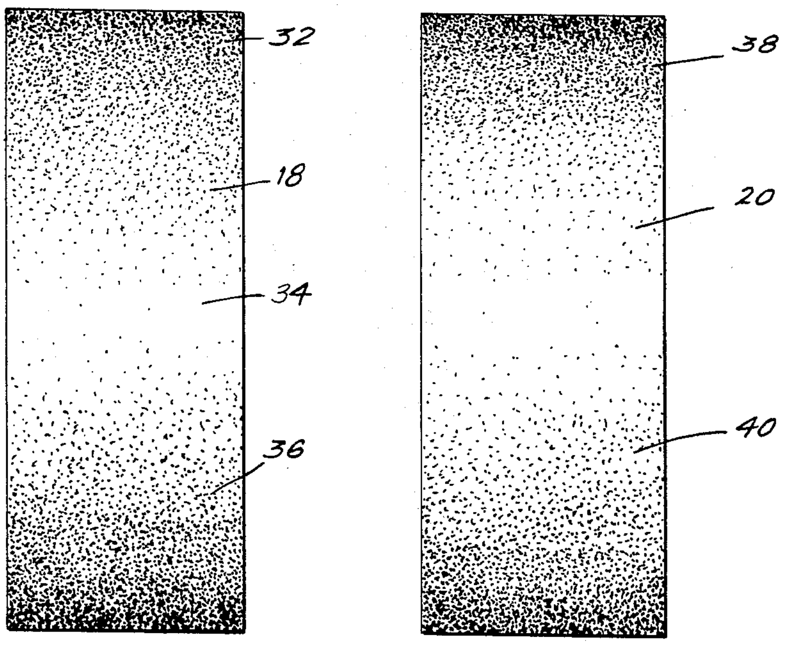
FIGURE 2 is an enlarged view of the filter wedges of FIGURE 1.
Figure 3:
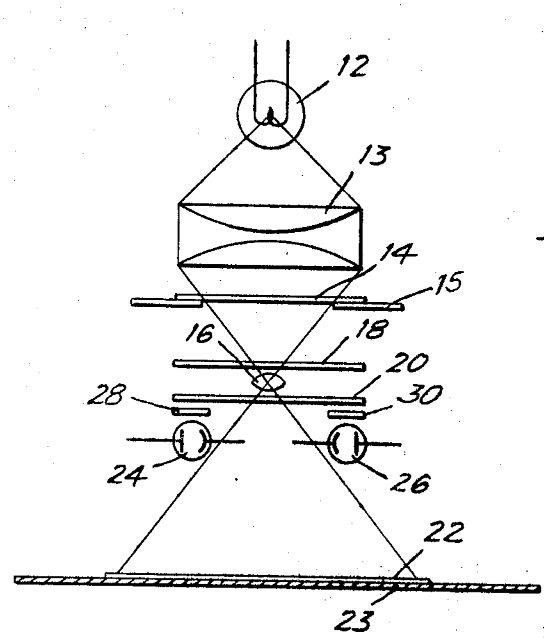
FIGURE 3 is a more detailed plan view of the printer of FIGURE 1.

The present invention provides a greatly simplified system of substantially reduced cost for producing color prints. Referring to FIGURES 1–3 of the drawings, the color printer generally indicated at 10 comprises a light source 12, such as an electric lamp, which passes light through a condensor 13 and a color negative 14 mounted on holder 15. Some of the light from the color negative 14 passes throughout a lens 16 and series filter wedges 18 and 20 to image on the print material 22 supported on easel 23.

Adjacent to the lens 16 and the color wedges 18 and 20 are two photoelectric cells 24 and 26 of conventional construction preferably having a low impedance. These photoelectric or photoconductive cells receive part of the light passing through the negative 14 and the serially arranged filter wedges 18 and 20.

Between the filter wedge 20 and the two cells 24 and 26 are arranged filters 28 and 30. Filter 28 in front of photo cell 24 is a blue filter such that the spectral response of the photo cell 24 closely matches that of the blue sensitive emulsion layer of the color print material 22. Filter 30 has three segments that can be moved successively in front of photo cell 26. The top filter segment is green and the middle filter segment is red so as to successively give photo cell 26 a spectral response similar to that of the green and red emulsion layers of the color print material 22. The bottom or third filter segment of filter 30 gives photo cell 26 approximately equal (panchromatic) sensitivity to blue, green and red light.

Filter wedges 18 and 20 are arranged in series one behind the other so as to successively intercept light passing through negative 14 from the light source 12. Filter wedge 18 has an uppermost section 32 formed as a cyan dye wedge. The cyan dye is most dense at the top of section 32, typically absorbing 97% of the red light and it becomes gradually lighter toward the bottom of section 32. The filter wedge 18 is completely clear over a short area 34 at the center of the wedge. Beneath clear area 34, a yellow dye wedge section 36 begins starting light and becoming dense at the bottom of wedge 18. The yellow dye also typically absorbs 97% of the blue light at its densest point. Filter wedge 18 is uniform across its width such that its transmission to photo cells 24 and 26 matches its transmission through the lens 16.

Filter wedge 20 is similar to wedge 18 except that a magenta dye wedge section 38 replaces the cyan dye at the top of the wedge. The magenta dye at 38 absorbs green light. The lower section 40 of filter wedge 20 is similar to lower section 36 of wedge 18 in constituting a yellow dye wedge.

It can be seen that by moving the filter wedges 18 and 20 in FIGURE 1 up or down, any ratio of absorption up to 30 to 1 of red, green or blue light can be achieved. This is accomplished without any light wasting neutral absorption which would accompany the effect of having cyan, magenta and yellow filters in place at one time.

Figure 4:
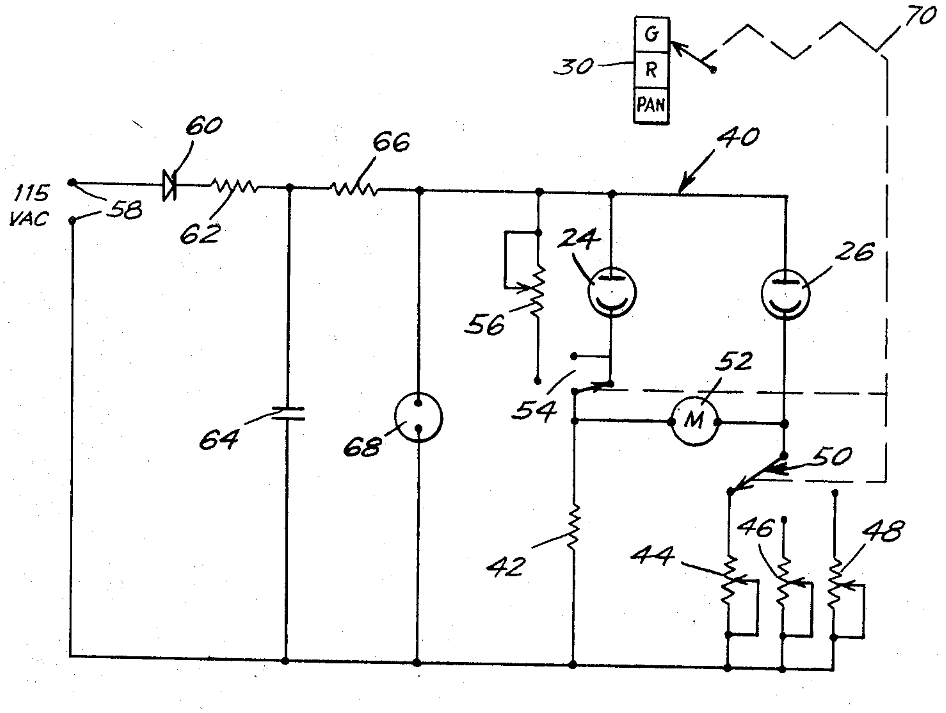
FIGURE 4 is a circuit diagram of a rebalancing bridge used in the printer of FIGURE 1.

The photo cells 24 and 26 are electrically connected in a bridge circuit illustrated in FIGURE 4. The bridge circuit generally indicated at 40 comprises photo cells 24 and 26 constituting variable resistances in the upper arms of the bridge, fixed resistor 42 in one lower arm of the bridge and variable resistors 44, 46 and 48 sequentially insertable into the other lower arm of the bridge by means of switch 50. Across the bridge is connected a null meter 52. A second switch 54 is provided for connecting a variable resistor 56 into the upper arm of the bridge when the switch 54 is in its third position.

The bridge 40 operates from conventional A.C. outlet terminals 58 with the signal passing through a rectifier 60, current limiting resistor 62, filter capacitor 62 and a 100,000 ohm resistor 66. This arrangement to a first order approximation provides a constant current D.C. power source to the typically average 10,000 ohm impedance of the bridge circuit 40. A neon lamp 68 prevents the full power supply voltage from appearing across the photo cells 24 and 26 when they are dark and their impedance is very high. With neon lamp 68 which typically has a 70 volt starting voltage, photo cells 24 and 26 with only an 80 volt break down voltage can be used even though the power supply may be 150 volts or more.

A typical example of the values of resistor 42 and the mid positions of resistors 44, 46 and 48 are each 10,000 ohms and the cell impedances of photo cells 24 and 26 when viewing a standard negative with representative filters in place are also typically 10,000 ohms each. Photo cell 26 typically has an impedance of 2,000 ohms when viewing a standard negative through the panchromatic filter. The exposure time required for the standard negative would be indicated near the mid-position of variable resistor 56. Resistor 56 would typically have an impedance of 2,000 ohms at this setting. Null meter 42 may be a 100–0–100 micro ampere, zero center movement.

In operation of the system, a color negative typical of those that give acceptable prints by the integrated exposure method described for example in the aforementioned British patent is placed in the printer and filter wedges 18 and 20 are vertically moved into position so as to yield an acceptable print. When the green filter segment of filter 30 is over photo cell 26, variable resistor 44 and photo cell 24 with its blue filter 28 are in the bridge circuit. As indicated in FIGURE 4 by the dashed lines 70, switches 50 and 54 are ganged with the mechanical movement of filter 30 so that when the green segment of filter 30 is in place, the switches are in the first position, as illustrated; when the red segment of filter 30 is in place, the switches are in the second position; and when the panchromatic section of filter 30 is in place, the switches are in the third position, with switch 54 coupling resistor 56 in the bridge circuit and switch 50 coupling resistor 48 in the bridge circuit.

With the green section of filter 30 in place and switches 54 and 50 in the first position, as shown in FIGURE 4, the impedances of the photo cells are a function of the blue light to photo cell 24 and the green light to photo cell 26 passing through the color negative 14 and through each of the color wedges 18 and 20. Regardless of the cell impedances, the bridge 40 can be balanced for a null meter reading by adjusting resistor 44 to satisfy the equation $$\frac{R_{24}}{R_{42}}=\frac{R_{26}}{R_{44}} \text{ or } R_{44}=R_{42}\times\frac{R_{26}}{R_{24}}$$

In a similar manner, when the red filter segment of filter 30 is over the photo cell 26, variable resistor 46 is in the circuit as is the blue reading photo cell 24. Resistor 46 can then be adjusted to satisfy the similar bridge balance equation $$R_{46}=R_{42}\times\frac{R_{26}}{R_{24}}$$

In this case, resistor 26 is a function of the red light passing through negative 14 and filter wedges 18 and 20.

Variable resistor 56 is preferably provided with a calibrated dial that reads exposure time directly in seconds. The calibration is an inverse function of the light intensity vs. resistance characteristics of photo cell 26 and can also take into account the average reciprocity failure characteristics of the three photographic emulsion layers. When the panchromatic filter segment of filter 30 is over photo cell 26, variable resistors 56 and 48 are in the bridge circuit. If the calibrated dial of resistor 56 is set to the known exposure time that gives a satisfactory print for the master negative 14, resistor 48 can be adjusted to give a null meter reading by satisfying the bridge balancing equation $$R_{48}=R_{42}\times\frac{R_{26}}{R_{56}}$$

In this case, resistor 26 is a function of the total light transmission of master negative 14 and the filter wedges 18 and 20.

Once the balance values for variable resistors 44, 46 and 48 are established, these resistors remain in the balance position and are left unchanged during the processing of additional negatives unless the particular print material emulsion or process characteristics are changed. The position of resistor 44 establishes a satisfactory color balance of green to blue, and the position of resistor 46 establishes the satisfactory color ratio of red to blue. If the ratios of green to blue and red to blue are thus held constant for all subsequent negatives, the ratio of red to green is necessarily likewise held constant. The position of variable resistor 48 represents the total intensity of light passing through the negative and wedges to the print.

In forming the prints from subsequent negatives, the master negative 14 is replaced by the color negative from which a print is desired, either as an enlargement or otherwise. The green segment of filler 30 is again moved over photo cell 26 with the switches 50 and 54 ganged therewith in the first position shown in FIGURE 4 and the filter wedge 20 is vertically moved into the proper position so that the bridge is balanced and meter 52 reads a null. With the green segment of filter 30 over photo cell 26 and the switches in the position shown, the bridge circuit can be balanced by making the ratio of blue to green light and thus the ratio of the impedances of photo cells 24 and 26 the same as they were with the previous or master negative. This is done by vertically moving filter wedge 20 which will, depending upon its position, absorb more or less of either green or blue light. Filter wedge 20 is then left in this position.

The red segment of filter 30 is then in place with the switches 50 and 54 in their second positions. A similar balancing can then be achieved by moving the filter wedge 18 which will absorb more or less red or blue light to obtain the correct ratio of red to blue. When the correct ratio has been established by the position of filter wedge 18, this wedge is then left in the correct position.

When the two color wedges 18 and 20 have been properly positioned, the ratio of green to blue, red to blue, and thus of necessity, green to red light transmission of the wedges, and the new negative is the same as for the previous negative with its original filter wedge positions.

Next, the third panchromatic section of filter 30 is positioned over photo cell 26 with the switches 50 and 56 in their third positions and variable resistor or potentiometer 56 is moved so that the bridge is balanced and the meter reads a null for the third time. The position of potentiometer 56, preferably calibrated to read time directly, is an indication of the exposure time required to make the time-intensity product for the new negative identical to that for the master negative which previously yielded an acceptable print. An emulsion paper can now be placed on the easel and an acceptable print made from the new negative using the exposure time indicated by the position of potentiometer 56.

The direction in which the null meter moves when there is a bridge unbalance is inversely related to the direction in which the filter wedges 18 and 20 must be moved, thus eliminating any confusion as to the direction of filter movement needed for a null balance.

With the color balance established by the appropriate positions of the color wedges for the new negative and the exposure time established by the new position of potentiometer 56, the prints can be exposed through the new negative and the color wedges for the time indicated by the position of the potentiometer. The approximation of the power supply in FIGURE 4 to a constant current source over the light range typically encountered makes it possible to calibrate the null balance meter to read the degree of unbalance of color ratios without regard to the transmission of the negative. This independence from transmission through the color negative is most useful when it is desired to purposely shift the color balance of a print by a known amount (for example, 20% more red light) from that given by the integrated light transmission method.

A further characteristic of the bridge circuit of FIGURE 4 is its complete insensitivity to minor line voltage fluctuations. Since the balancing system takes into account the color temperature and brightness of the printing lamp, the only demand on line voltage is that it be reasonably constant during the interval between color balancing and exposure.

Figure 5:
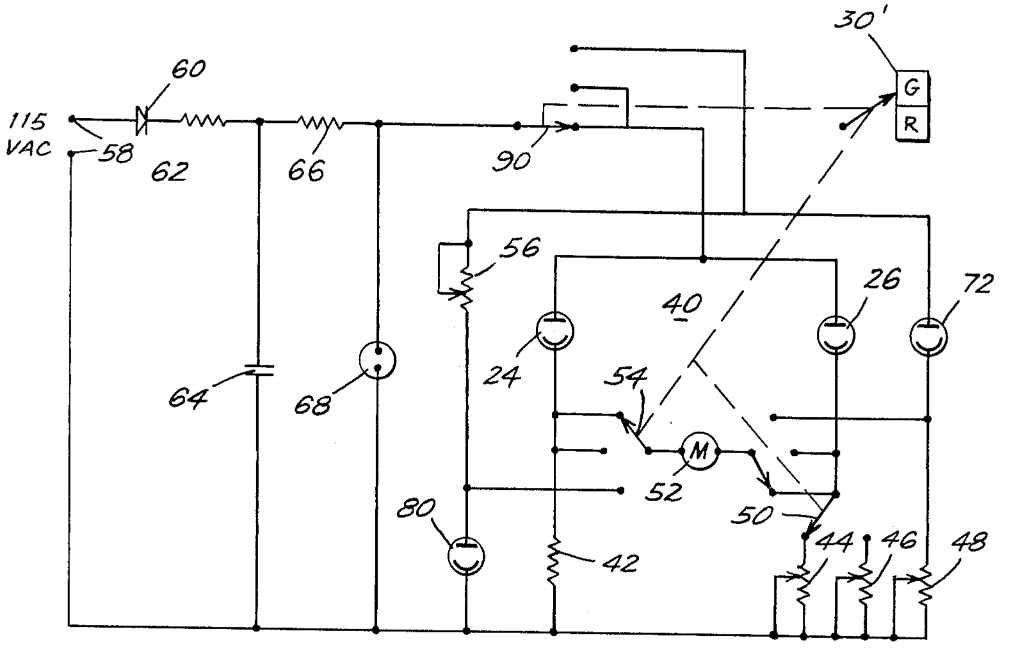
FIGURE 5 is a circuit diagram of a modified exposure control system.
Figure 6:
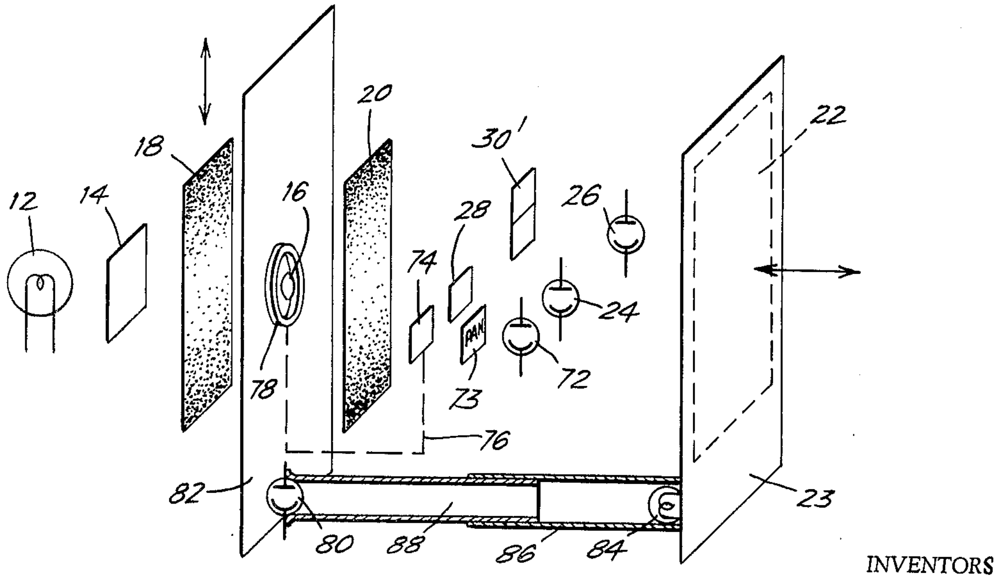
FIGURE 6 is a diagrammatic perspective view of the modified system of FIGURE 5.

In systems where it is desirable to have a variable copy ratio enlarger with a variable aperture lens, a separate bridge circuit incorporating a third panchromatic filtered photo cell may be used advantageously in place of the third filter position in the two photo cell system of FIGURE 4. Such an arrangement is illustrated in FIGURES 5 and 6 wherein like parts bear like reference numerals. In this embodiment, panchromatically filtered photo cell 72 with panchromatic filter 73 is mounted adjacent the lens 16 and the other photo cells 24 and 26 so as to see the same filter transmission as the lens. Also positioned over photo cell 72 is a movable neutral density wedge filter 74 that is mechanically linked, as indicated by dashed lines 76 in FIGURE 6 with the lens diaphragm adjusting ring 78 so that the transmission of the filter 74 to the photo cell 72 is a function of the relative transmission of the lens 16.

To compensate for the change in distance of the lens 16 from the easel 23 holding print 22 with variations in magnification ratio, the fixed leg of the bridge 40 is replaced by a fourth photo cell 80 mounted on the lens board 82 which views a small incandescent lamp 84 mounted on the easel. To eliminate stray light a telescoping tube 86 with a light absorbing inside surface 88 connects the lamp 84 and photo cell 80. One end of tube 86 is secured to the lens board and the other end to the easel. The resistance of the photo cell 80 changes with changing distance from the easel in such a manner as to unbalance the bridge so as to require the exposure time calibrated potentiometer 56 to be repositioned so as to call for an exposure time that will just compensate for the difference in light intensity at the easel due to change in lens to easel distance. Switch 90 in FIGURE 5 is ganged with switches 50 and 54 so that photo cells 72 and 80 are connected to the power supply as a part of the bridge circuit for the exposure determination.

It is well known that any electronic system, in order to yield satisfactory prints, must be adjusted not only for variations in negative transmission but must also be adjusted so that its response matches that of the particular emulsion and developing process used. Generally, the procedure presently used to align a photo electric color control system to a particular emulsion and process is as follows:

(1) Using the manufacturer's recommendation, previous experience or other information which might be available, the color controls of the photo electric system are adjusted and one or more test prints is exposed and processed from a negative whose desired resultant print is known.

(2) The test print which most closely matches the desired print is selected and the color and degree of difference between the test print and the desired print is estimated.

(3) The color controls of the photo electric system are adjusted according to the information obtained in step (2) above and a second series of prints are made.

(4) Steps (2) and (3) are repeated until the test print matches the desired print.

With an experienced worker making the estimates, it ordinarily may take two or three printings to accomplish the desired print. With one not so experienced, the operation may be an almost endless task of over- or under-correcting before an acceptable color match is achieved. It is to be noted that the critical operation in the procedure involves the visual judgment between the test print and desired print, not only as to color difference but as to the amount of such difference. Such judgment has generally been found quite difficult to acquire.

The method described below makes use of the ability of a photo electric control system such as those of FIGURES 1–6 to recognize colors and/or color changes and to interpret these observations in a quantitative manner that can be applied to the adjustment of its own controls and thus eliminate the need for a visual color judgment in balancing a color exposure control system for a new emulsion, a change in process, or a change in any variable of the printing, processing or exposure control system.

Although the method is applicable to virtually any known photo electric control system, it will be described in conjunction with the printing system of FIGURES 1–4. Referring to FIGURES 1–4, it is assumed that the exposure control adjustments are set properly for the emulsion in use. With no negative in the negative carrier and the exposure control system balanced for this "clear negative," a print is exposed and processed. The resulting print (print A) is a homogeneous patch, the color and density of which represent the print emulsion and process interpretation of the integrated color transmission of the negative and filters to which the exposure control system is adjusted. This print is typically a neutral gray of reflection density 1.0.

If print A is now placed in the negative carrier, it can be considered a "negative" and the printing filters adjusted until the exposure control system shows a null. A print B is now made using the exposure time indicated by the exposure control system. Because of the high density of the print base, the exposure time will be many times as long as that for print A. However, if the exposure control system is accurate, print B is identical to print A since the principle of the exposure control system is that the integrated exposure that the green, blue and red emulsion layers receive will always be the same regardless of the negative characteristics. It is thus seen that prints A and B have the unusual quality of being negatives whose prints are identical to them.

Next, a print emulsion of different balance is placed on the easel, for example, with blue emulsion speed of one-half, green speed twice and red speed the same as the emulsion to which the exposure control system is adjusted. A print C is now made on this new emulsion using print A as a negative and using the filtration and exposure time called for by the exposure control system which, of course, will be the same as for print B. The resulting homogeneous patch (print C), instead of being neutral gray, is magenta-blue, that is, there is roughly one-half the yellow dye (a function of blue speed), twice the magenta dye (a function of green speed) and the same cyan dye (a function of red speed).

Print C is now placed in the negative carrier and it is observed that the exposure control system no longer shows a null balance. The off null shows, by the direction of meter deflection, that there is more blue, less green and the same red transmission in this print-negative as there was in print-negative A. Since this information relates directly to the difference between the two emulsions, the unbalance can be used as a basis for readjusting the color sensitivity controls of the exposure control system. For the exposure control system of FIGURES 1–4, the readjustment is accomplished by repositioning potentiometers 44, 46 and 48 for each position of switches 50 and 54 to rebalance the bridge. It is important that the color wedges 18 and 20 and the exposure time calibrated potentiometer 56 not be moved between the time of exposing print C and the readjusting of variable resistors or potentiometers 44, 46 and 48.

Now print-negative A is replaced in the negative carrier and the filters and the exposure time calibrated potentiometer 56 are adjusted for a null in the manner described in conjunction with FIGURES 1–4 and print D is now exposed and processed. Print D will bear a much closer resemblance to prints A and B than did print C, and if the readjusting and rebalancing operations described above are repeated using print D in place of print C, the next print E will be a still closer, if not perfect, match to prints A and B. With the prints thus matched, the system is now ready for use with the new emulsion.

As can be seen, the present invention provides a novel, simplified printing apparatus of substantially reduced cost. The system completely eliminates the need for guess work and is substantially independent of minor variations in voltage supply and automatically compensates for the effects of lamp aging and shifts in lamp color temperature. The novel rebalancing method of the present invention makes it possible to not only compensate for different negative transmissions but also to adjust the exposure control system to different emulsions and developing processes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A color printer comprising a negative carrier for holding a color negative, an easel for supporting a photographic emulsion, a source of light for directing light through said negative onto said emulsion, and variable filter means intermediate to said negative and said easel for maintaining the color balance of the light impinging on said easel constant for different negatives in said negative carrier, said variable filter means consisting of a pair of movable combination filter wedges including variable density cyan, yellow and magenta dyes, the small center portion of each of said combination filter wedges being clear and the bottom and top portions, of each combination filter wedge, each being provided with a variable density area of one of said dyes, the density of the dyes increasing from a minimum at a point adjacent the clear center portion of the combination filter wedge to a maximum at the bottom and top of the combination filter wedge, wherein one of said combination filter wedges is provided with a first variable density area of one of said dyes and a second variable density area of another of said dyes and said other combination filter wedge is provided with a first variable density area of the first of said dyes and a second variable density area of said other dye.

2. A color printer as defined in claim 1 including, a first photocell for sensing the amounts of two color components in the light passed by said negative, a second photocell for sensing the amount of a third color component in the light passed by said negative, and an electrical bridge circuit including said photocells for determining the ratios of said color components.

3. A color printer as defined in claim 2 wherein said first photocell is provided with alternate filters for sequentially passing said two color components and said second photocell is provided with a filter for passing said third color component, said component filters and photocells being positioned to intercept a portion of the light passing through said negative from said light source.

4. A color printer as defined in claim 3 wherein one of said photocells is provided with an additional panchromatic filter and said bridge circuit includes a time calibrated variable resistor for indicating exposure time when said panchromatic filter is over said one photocell.

5. A color printer as defined in claim 1 including first panchromatically filtered photocell means for intercepting a portion of the light passing through said negative and said variable filter means, said first photocell means including a variable density filter mechanically coupled to and movable with said lens actuator, second photocell means for sensing the distance of said easel from said lens, and a bridge circuit including said first and second photocell means, said bridge circuit including a time calibrated variable resistor for indicating exposure time required to maintain a constant intensity-time product for variable lens aperture, variable negative to filter transmission and variable distances of said easel from said lens.

6. A color printer as defined in claim 5 wherein said second photocell means is mounted adjacent said lens, a second light source is mounted adjacent said easel, and a telescoping tube for transmitting light from said second light source to said second photocell means is mounted adjacent said easel from said second light source to said second photocell means.

References Cited by the Examiner

UNITED STATES PATENTS

| | | | |
|---|---|---|---|
| 2,947,232 | 8/1960 | Armentrout et al. ---- | 88—24 X |
| 3,083,614 | 4/1963 | Veit ---------------- | 88—24 |

NORTON ANSHER, *Primary Examiner.*

EMIL G. ANDERSON, *Examiner.*

R. A. WINTERCORN, *Assistant Examiner.*